United States Patent
Akutsu et al.

(10) Patent No.: US 7,183,952 B1
(45) Date of Patent: Feb. 27, 2007

(54) RESOLVER

(75) Inventors: Satoru Akutsu, Tokyo (JP); Shinsuke Hemmi, Tokyo (JP); Shuji Isono, Tokyo (JP); Seiki Kodama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/346,200

(22) Filed: Feb. 3, 2006

(30) Foreign Application Priority Data

Oct. 7, 2005 (JP) .............................. 2005-294771

(51) Int. Cl.
*H03M 1/48* (2006.01)
(52) U.S. Cl. ...................................... 341/115; 341/112
(58) Field of Classification Search ......... 341/111–117
See application file for complete search history.

(56) References Cited

U.S. PATENT DOCUMENTS

| | | | | |
|---|---|---|---|---|
| 4,933,674 A | * | 6/1990 | Gasperi et al. | ............. 341/115 |
| 2003/0137295 A1 | | 7/2003 | Akutsu et al. | |
| 2005/0168217 A1 | | 8/2005 | Nakano et al. | |

FOREIGN PATENT DOCUMENTS

| | | |
|---|---|---|
| JP | 07-318369 A | 12/1995 |
| JP | 2001-128484 A | 5/2001 |

* cited by examiner

*Primary Examiner*—Linh Nguyen
*Assistant Examiner*—Lam T. Mai
(74) *Attorney, Agent, or Firm*—Sughrue Mion, PLLC (57) ABSTRACT

A resolver can make accurate angle detection in an entire detection range. The resolver includes a resolver stator having an excitation winding of one phase adapted to be excited by a power supply and a first and a second output winding of two phases for outputting a change in the density of magnetic flux as a voltage, a resolver rotor arranged at a central portion of the resolver stator so as to cooperate with the resolver stator for changing a gap permeance between the resolver rotor and the resolver stator in accordance with the rotation of the resolver rotor, and a detection error correction part that corrects an angle detection error of the resolver by using the value of a Lissajous radius of a circular Lissajous waveform obtained from the amplitudes of an output signal Scos from the first output winding and an output signal Ssin from the second output winding.

4 Claims, 7 Drawing Sheets

RESOLVER

BACKGROUND OF THE INVENTION

1. Field of the Invention

The present invention relates to a resolver with a resolver stator having an excitation winding of one phase adapted to be excited by a power supply and output windings of two phases for outputting a change in the density of magnetic flux as a voltage.

2. Description of the Related Art

As a conventional resolver, there has been known one in which a predetermined current is supplied to a three-phase motor with its two phases being short-circuited with each other thereby to stop the three-phase motor to a reference position, and the rotation angle of a rotor at that time is detected by a resolver, so that a reference position of the resolver with respect to the rotor is adjusted so as to correct an angle detection error of the resolver (see, for example, a first patent document: Japanese patent application laid-open No. 2001-128484).

In this resolver, however, the error of the rotation angle of the rotor detected by the resolver at the reference position of the rotor becomes zero, but gives rise to a problem that an accurate rotation angle can not be detected in the entire rotation angle range except for the reference position of the rotor.

SUMMARY OF THE INVENTION

The present invention is intended to solve the problem as referred to above, and has for its object to provide a resolver which is capable of making accurate angle detection in the entire detection range.

A resolver according to the present invention includes a resolver stator having an excitation winding of one phase adapted to be excited by a power supply and output windings of two phases for outputting a change in the density of magnetic flux as a voltage; a resolver rotor that is arranged at a central portion of the resolver stator and cooperates with the resolver stator for changing a gap permeance between the resolver rotor and the resolver stator in accordance with the rotation of the resolver rotor; and a detection error correction part that corrects an angle detection error of the resolver by using the value of a Lissajous radius of a circular Lissajous waveform obtained from respective amplitudes of an output signal Scos output from the first output winding and an output signal Ssin output from the second output winding of the output windings of the two phases, which are obtained by the following expressions:

$$S\cos = K \cdot E \cdot \sin \omega t \cdot \cos(\theta)$$

$$S\sin = K \cdot E \cdot \sin \omega t \cdot \sin(\theta)$$

where K represents a voltage transformation ratio of the resolver; E represents the excitation voltage generated on the excitation winding by means of the power supply; $\omega$ represents an angular velocity of an excitation signal generated by exciting the excitation winding by means of the power supply; t represents time, and $\theta$ represents an electrical angle of the resolver.

According to the resolver of the present invention, it is possible to make accurate angle detection in the entire detection range.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described while referring to the accompanying drawings. Throughout respective figures, the same or corresponding members or parts are identified by the same reference numerals and characters.

Embodiment 1

Figure 1:
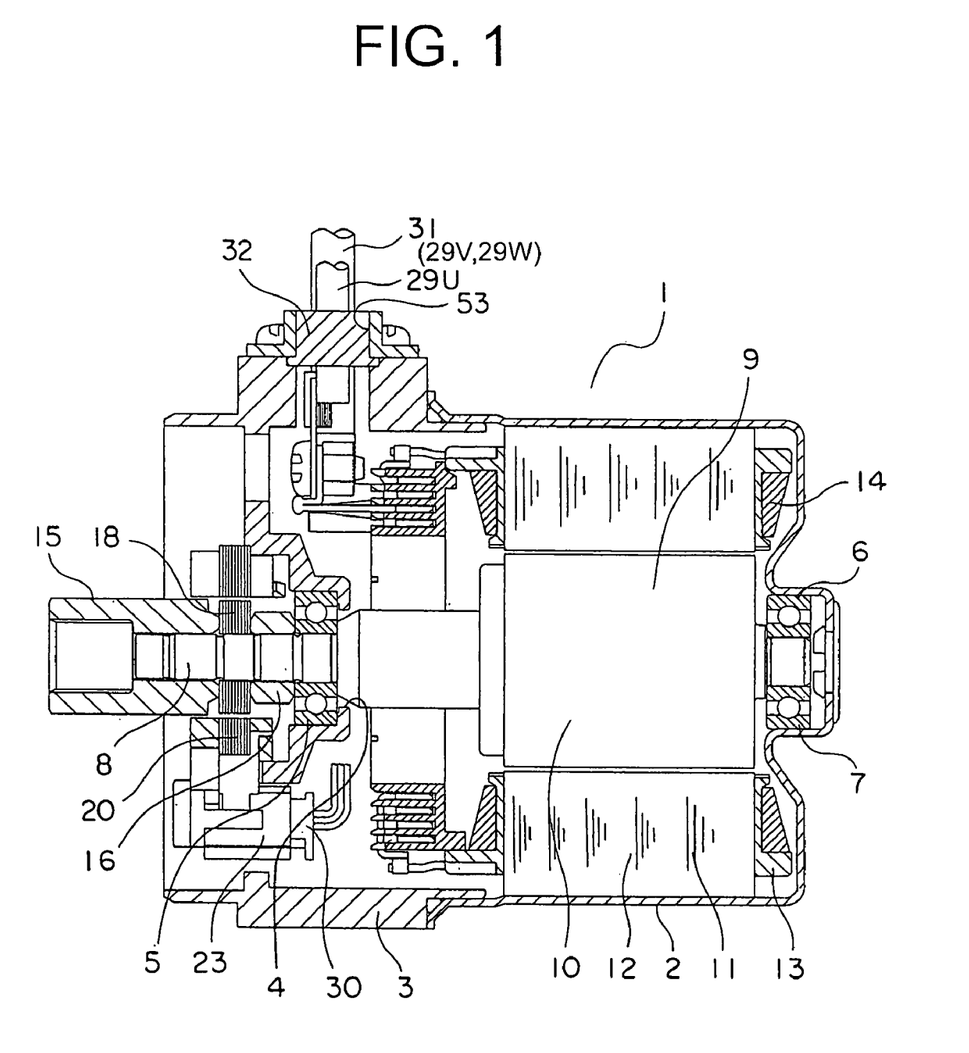
FIG. 1 is a cross sectional side view showing a brushless motor according to a first embodiment of the present invention.

FIG. 1 is a cross sectional side view that shows a brushless motor 1 (hereinafter referred to simply as a motor) according to a first embodiment of the present invention.

In this figure, the motor 1 is a motor that is built into an electric power steering apparatus, and has a bottomed cylindrical frame 2 that is formed by drawing an iron plate, and a housing 3 that is made of aluminum and is fixedly secured to the frame 2 so as to cover an opening portion of the frame 2.

A front bearing 5 is mounted on the housing 3 with its outer ring being fixedly caulked to a window portion 4 formed in the center of the housing 3.

Also, a concave-shaped bearing box 6 is arranged on the bottom of the frame 2, and a rear bearing 7 is press-fitted in the bearing box 6.

The front bearing 5 and the rear bearing 7 serve to rotatably support a front end and a rear end, respectively, of a shaft 8 made of iron that is a magnetic material.

Mounted on one end of the shaft 8 is a rotor 10 with a magnet 9 attached thereto for generating a magnetic field. An unillustrated protective tube for protecting the magnet 9 is covered on the outer peripheral surface of the magnet 9.

The stator 11 enclosing the outer periphery of the rotor 10 is attached to the inner peripheral surface of the frame 2.

The stator 11 has a stator core 12 formed of laminated silicon steel plates, an insulator 13 made of resin, and a motor coil 14 wound around the insulator 13. The motor coil 14 is composed of a three-phase coil comprising a U-phase coil, a V-phase coil and a W-phase coil, and the coils of the respective phases are connected with one another in a star configuration.

A bush 16, being in abutting engagement with the front bearing 5, is press-fitted over the shaft 8 at a side of the housing 3 opposite to the rotor 10, and a boss 15, being spline coupled to an external mechanism, is press-fitted to an end of the shaft 8 at a side of the housing 3 opposite to the rotor 10.

Figure 2:
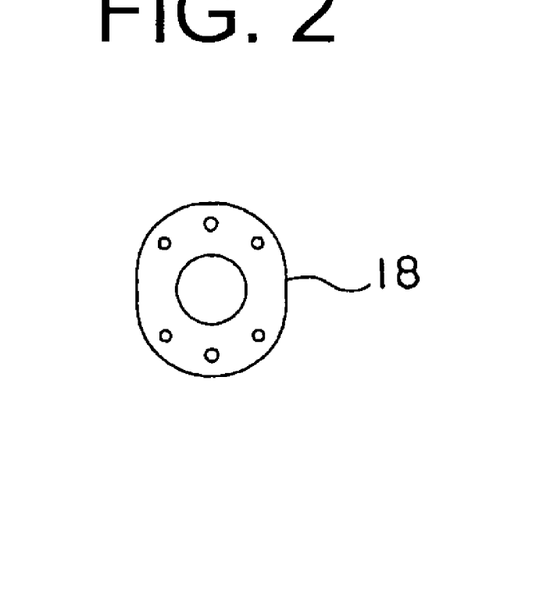
FIG. 2 is a front elevational view of a resolver rotor of FIG. 1.
Figure 3:
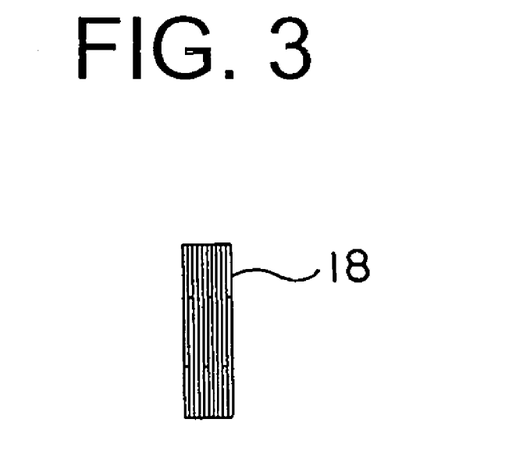
FIG. 3 is a side elevational view of FIG. 2.

A resolver rotor 18 with its opposite end surfaces being in abutting engagement with the bush 16 and the boss 15, respectively, is arranged between the bush 16 and the boss 15. As shown in FIGS. 2 and 3, the resolver rotor 18 is of an elliptical shape and is formed of laminated silicon steel plates, and it is press-fitted over the shaft 8.

Figure 4:
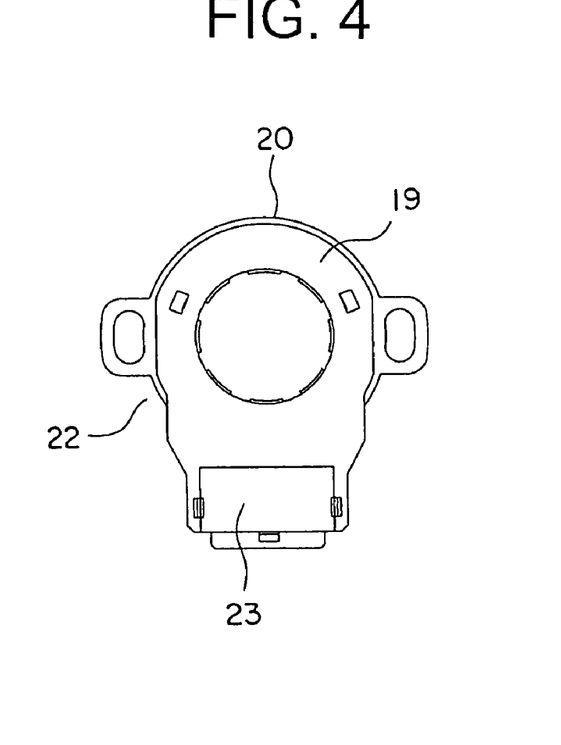
FIG. 4 is a front elevational view of a main body of a resolver shown in FIG. 1.
Figure 5:
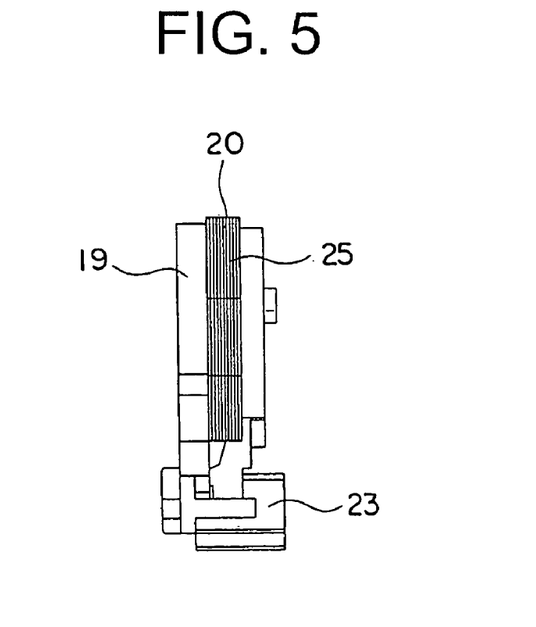
FIG. 5 is a side view of FIG. 4.
Figure 6:
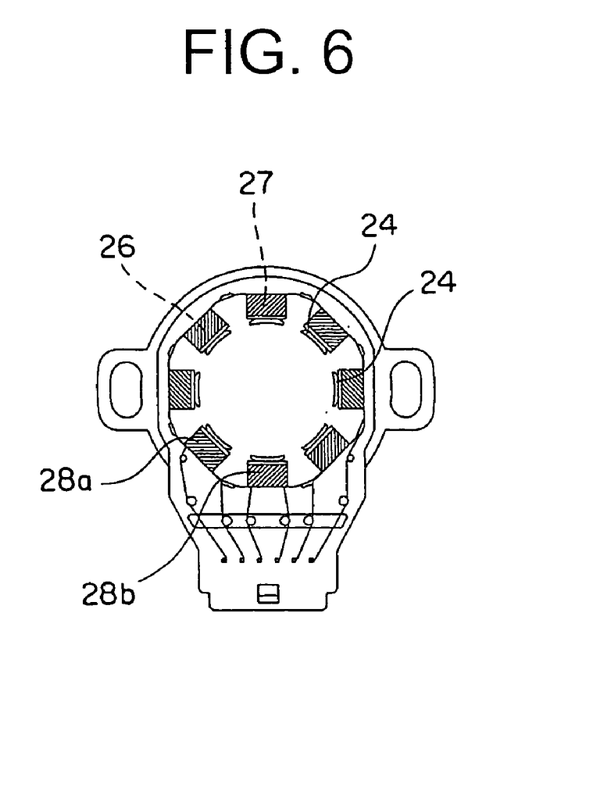
FIG. 6 is a front elevational view showing the interior of the resolver main body of FIG. 4.
Figure 7:
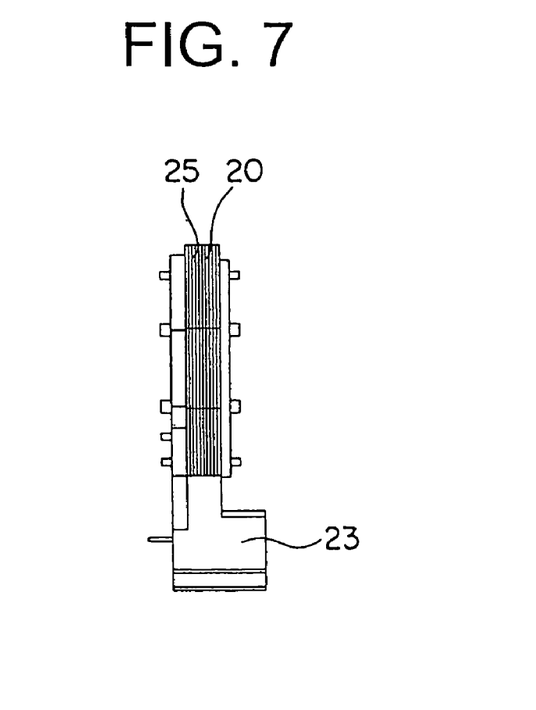
FIG. 7 is a side elevational view of FIG. 6.

FIG. 4 is a front elevational view of a resolver main body 22, and FIG. 5 is a right side view of FIG. 4. FIG. 6 is a view with a cover 19 being removed from the resolver main body 22 of FIG. 4, and FIG. 7 is a right side view of FIG. 6.

The resolver main body 22, cooperating with the resolver rotor 18 to constitute the resolver, is arranged so as to enclose the outer periphery of the resolver rotor 18. The resolver main body 22 is fixedly attached to the housing 3 by means of screws (not shown).

The resolver main body 22 has a resolver stator 20, cover 19 with which the opposite side surfaces of the resolver stator 20 are covered, and a male side connector 23 for connection of a signal line.

The resolver stator 20 includes a laminated body 25 that is formed of laminated silicon steel plates and has a plurality of teeth 24 formed at an equal interval in a circumferential direction, an excitation winding 27 of a single phase with its conductor being wound around the teeth 24 through an insulator 26, and a first output winding 28a and a second output winding 28b of two phases.

The excitation winding 27 of one phase is constructed by winding the conductor continuously around the respective adjoining teeth 24 over the entire circumference. The first output winding 28a is constructed by winding its conductor continuously on the excitation winding 27 around every other one of the adjoining teeth 24. Also, the second output winding 28b is constructed by winding its conductor continuously on the excitation winding 27 around every other one of the adjoining teeth 24. The first output winding 28a and the second output winding 28b are wound around the laminated body 25 in a mutually adjacent positional relation with respect to each other.

Motor lead wires 29U, 29V, 29W, which are connected to the motor coil 14 for supplying electric power thereto, are arranged to penetrate through a grommet 32 fitted into a lead hole 53 formed in the housing 3. In addition, a sensor lead wire 31, which is connected to the male side connector 23 through a female side connector 30 for transmitting a signal related to the rotation angle of the rotor 10 to the outside, is also arranged to penetrate through the grommet 32.

Figure 8:
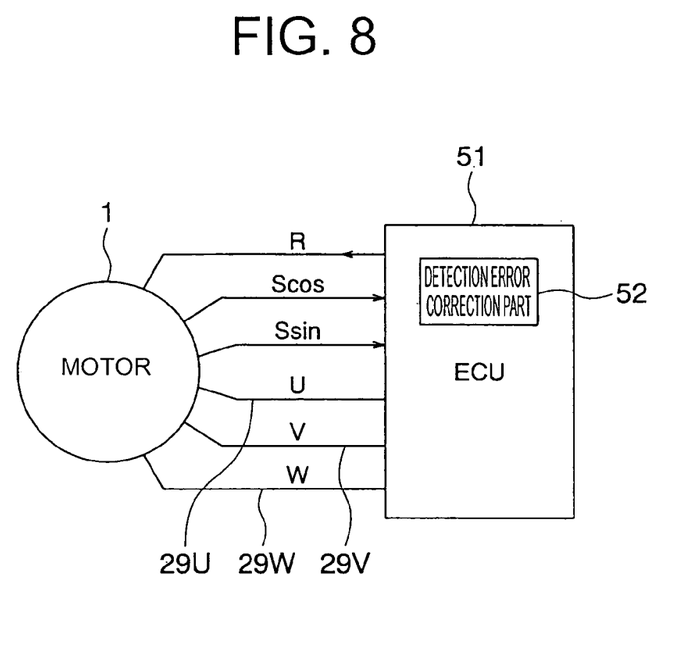
FIG. 8 is a view showing a relation between the motor and an engine control unit (ECU) of FIG. 1.

FIG. 8 is a view that shows a connection relation between the motor 1 and an ECU 51 (Electronic Control Unit), wherein an excitation signal R from the ECU 51 is sent to the motor 1 through the sensor lead wire 31, and output signals Scos, Ssin from the first output winding 28a and the second output winding 28b of the resolver of the motor 1 are also sent to the ECU 51 through the sensor lead wire 31. Also, a drive current from the ECU 51 is supplied to the motor 1 through the three motor lead wires 29U, 29V, 29W.

In addition, a detection error correction part 52 is built into the ECU 51 that controls the driving of the motor 1. The detection error correction part 52 calculates an angle detection error of the resolver based on the output signal Scos and the output signal Ssin input thereto, stores correction data for the angle detection error thus calculated, and corrects the angle detection error of the resolver based on the correction data.

Hereinbelow, reference will be made to the operation of the motor of the above-mentioned construction.

An excitation voltage in the form of a sinusoidal excitation signal R of 10 kHz and 5 Vpp is impressed from the ECU 51 to the excitation winding 27 of the resolver stator 20. By the impression of the excitation voltage to the excitation winding 27, an excitation current flows to the excitation winding 27, so that a magnetic flux is generated in a space defined between the resolver rotor 18 and the resolver stator 20.

Moreover, electric power is supplied from the motor lead wires 29U, 29V, 29W to the motor coil 14, so that a three-phase alternating voltage is impressed to the motor coil 14. By the impression of the three-phase alternating voltage to the motor coil 14, a rotating field is generated in the motor coil 14 whereby the rotor 10 is caused to rotate.

Together with the rotation of the rotor 10, the resolver rotor 18 is also rotated whereby a gap permeance between the resolver rotor 18 and the resolver stator 20 is changed, as a result of which the amplitude and the phase to the excitation signal R of each of the output signal Scos from the first output winding 28a and the output signal Ssin from the second output winding 28b are caused to change.

The amplitude changes of the output signals Scos and the output signal Ssin are out of phase by 90 degrees with respect each other, and the output signal Scos and the output signal Ssin are respectively sent through the sensor lead wire 31 to the ECU 51.

The output signal Scos and the output signal Ssin input to the ECU 51 are corrected based on the correction data by the detection error correction part 52 in which the correction data is stored beforehand, whereby the rotation angle of the rotor 10 is detected in an accurate manner.

Next, a method for calculating the above-mentioned correction data will be described below.

The excitation signal R is represented by the following expression (1).

$$R = E \cdot \sin \omega t \tag{1}$$

Also, the output signal Scos of the first output winding 28a and the output signal Ssin of the second output winding 28b are represented by the following expressions (2) and (3), respectively.

$$S\cos = K \cdot E \cdot \sin \omega t \cdot \cos(\theta) \tag{2}$$

$$S\sin = K \cdot E \cdot \sin \omega t \cdot \sin(\theta) \tag{3}$$

where E is the excitation voltage; K is the voltage transformation ratio of the resolver; ω is the angular velocity of the excitation signal R; t is time, and θ is the electrical angle of the resolver.

Further, the electrical angle θ of the resolver is obtained by the following expression (4).

$$\theta = \tan^{-1}(S\sin/S\cos) \tag{4}$$

In this case, the output signal Scos and the output signal Ssin are each generated in the form of a sinusoidal wave of 10 kHz, as in the case of the excitation signal R, so they are detected as amplitude values, and the signs of the output signals are calculated in such a manner that they are plus when the excitation signal R and the output signals Scos, Ssin are of the same phase and minus when they are of opposite phases.

Figure 9:
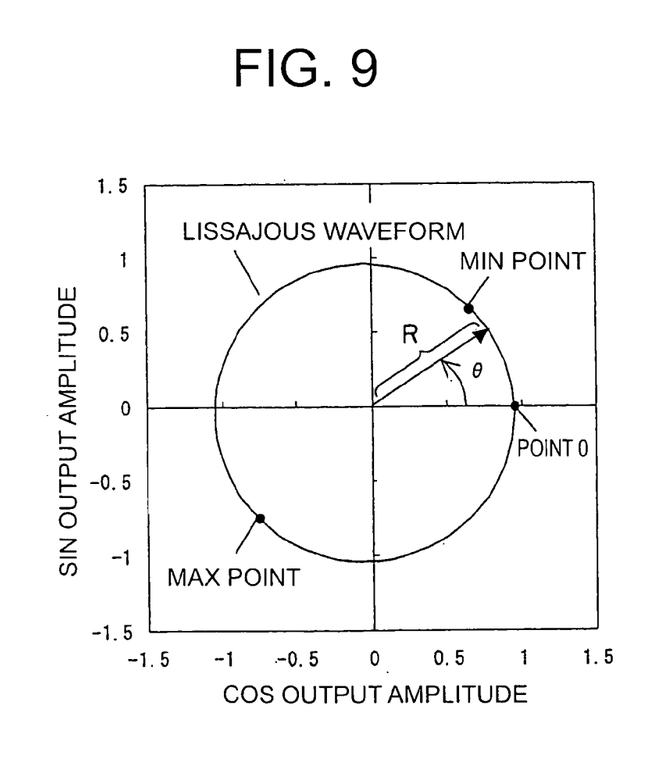
FIG. 9 is a Lissajous waveform view.

At this time, when the output signal Scos used for the angle calculation is plotted on the axis of abscissa and the output signal Ssin on the axis of ordinate, there is created a graph in the form of a circular Lissajous waveform, as shown in FIG. 9. The radius R of this Lissajous waveform is obtained by the following expression (5).

$$R = \sqrt{((S\cos)^2 + (S\sin)^2)} \quad (5)$$

Figure 10:
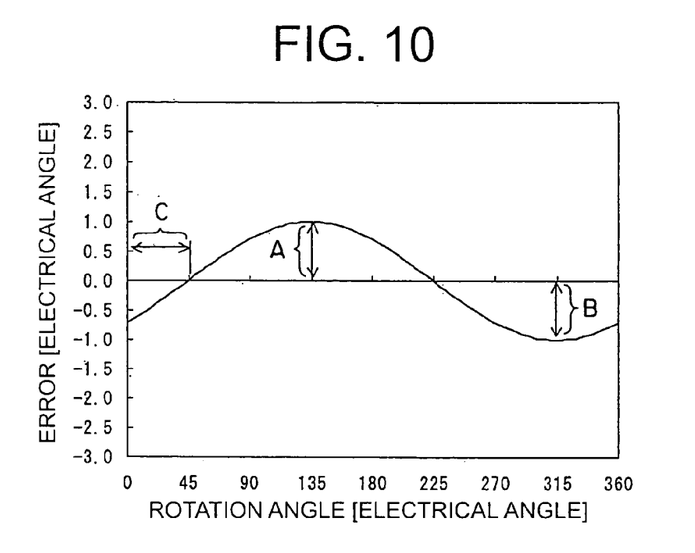
FIG. 10 is a view showing a relation between the rotation angle of the rotor and a detection error before correction thereof by a detection error correction part.

The angle detection error of the resolver generally becomes a sinusoidal waveform that changes one period per electrical angle of 360 degrees of the resolver, as shown in FIG. 10.

Note that the electrical angle of the resolver is represented by a mechanical angle×(multiplied by) an axial double or multiple angle n of the resolver. Herein, the resolver axial double or multiple angle is a value how many times the detection angle of the resolver changes per mechanical angle of 360 degrees, and the electrical angle of the resolver is generally made coincident with the electrical angle of the motor 1 but can be available even if set equal to ½, ¼, etc., of the electrical angle of the motor 1.

Here, an error amplitude A, an error amplitude B and an error phase C of the angle detection error are obtained from a maximum value (MAX) and a minimum value (MIN) of the Lissajous radius R, and an angle θ m at the minimum (MIN) point of the radius R according to the following expressions.

$$\text{error amplitude } A = 2 \times \sin^{-1}\{(MAX-MIN)/(2\times(MAX+MIN)))\} \quad (6)$$

$$\text{error amplitude } B = 2 \times \sin^{-1}\{(MAX-MIN)/(2\times(MAX+MIN)))\} \quad (7)$$

$$\text{error phase } C = \theta\ m \quad (8)$$

As can be seen from the above expressions (6), (7), the value of the error amplitude A and the value of the error amplitude B generally become the same.

Here, note that the value of θ m need only be obtained from the values of Ssin and Scos at the minimum (MIN) point of the radius R according to the above-mentioned expression (4).

Figure 11:
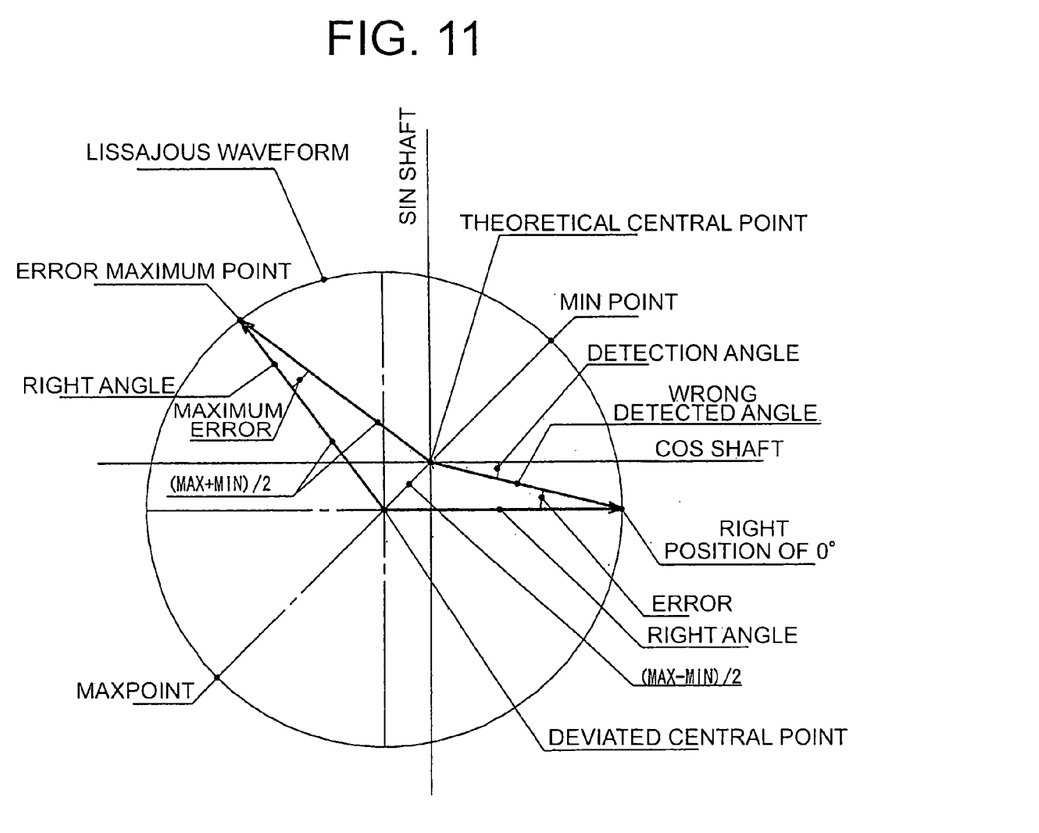
FIG. 11 is an explanatory view illustrating a formula for calculation of an error amplitude of the resolver.

FIG. 11 is an explanatory view for the calculation of the values of the error amplitude A and the error amplitude B.

A theoretical central point is a point at which the COS output and the SIN output are zero, and the angle detection is carried out based on this theoretical central point, so if there is a deviation in the actual center of the Lissajous waveform, there will be a detection error.

In FIG. 11, the central point of the Lissajous waveform deviates by (MAX−MIN)/2 from the theoretical central point to the lower left. Here, note that the values of MAX and MIN are the distances from the theoretical central point to the maximum and minimum points of the Lissajous radius R, respectively.

There occurs no error at the minimum (MIN) point and at the maximum (MAX) point, and a maximum point of error becomes the vertical angle of an isosceles triangle. As a result, the vertical angle corresponds to the error amplitudes A, B. That is, the error amplitudes A, B become as follows.

$$2 \times \sin^{-1}\{((MAX-MIN)/4)/((MAX+MIN)/2)\} = 2 \times \sin^{-1}\{(MAX-MIN)/(2\times(MAX+MIN))\}$$

Figure 12:
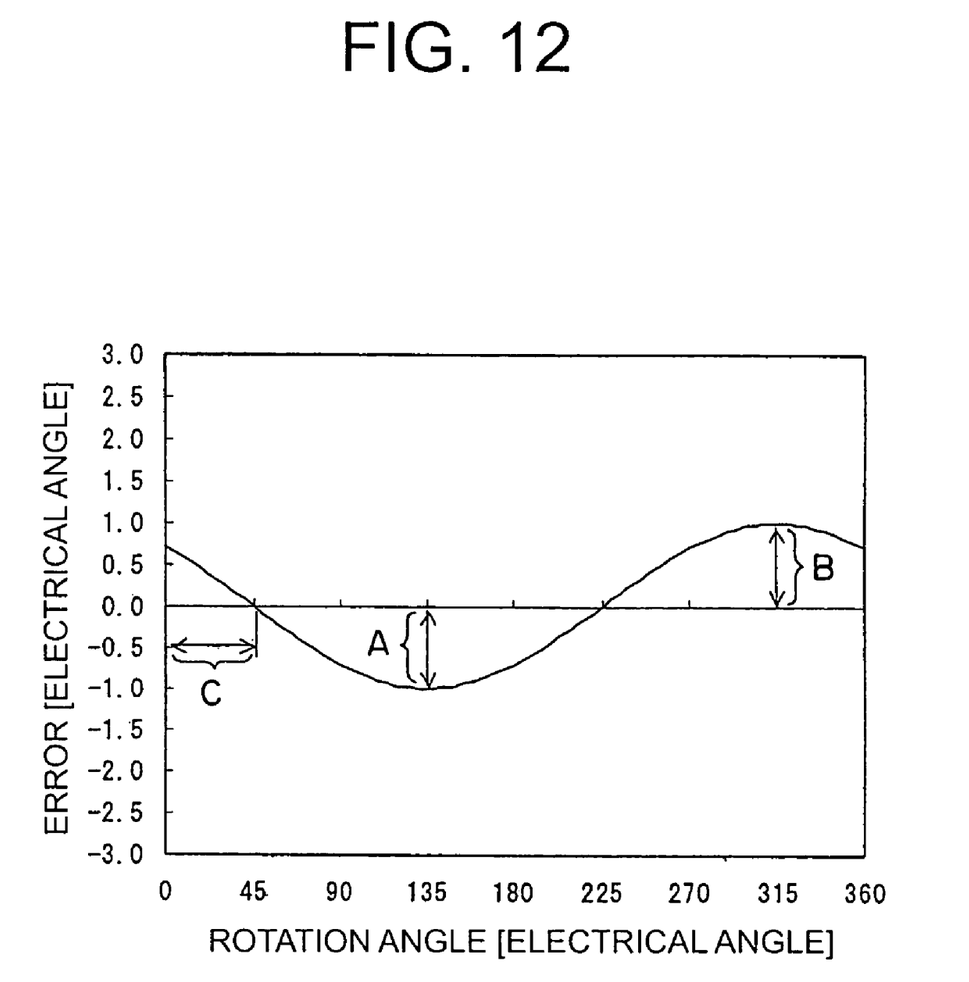
FIG. 12 is a view showing a relation between the rotation angle of the rotor that was calculated and stored by the detection error correction part, and an error to be corrected.

The correction data shown in FIG. 12 is prepared from the values of the error amplitude A, the error amplitude B and the error phase C obtained by the above expressions.

As described in the foregoing, according to this resolver, by the provision of the detection error correction part 52, the rotation angle of the rotor 10 can be accurately detected in the entire detection range.

In general, if there is an angle detection error of the resolver, a correct current corresponding to the position of the rotor 10 is not able to be supplied and hence the torque ripple of the motor becomes large, but according to the present invention, the angle detection error can be reduced, so the torque ripple can be made smaller, and comfortable steering can be obtained.

In addition, the detection error correction part 52, being built into the ECU 51 that drives and controls the motor 1, is lower in cost as compared with one that requires external equipment with an angle reference for obtaining the correction data, such as, for example, what is described in Japanese patent application laid-open No. H07-318369.

It is to be noted that the correction data may be obtained from the respective average values of the maximum (MAX) values and the minimum (MIN) values of a plurality of Lissajous radiuses R, or from the maximum (MAX) value and the minimum (MIN) value of one Lissajous radius R.

Moreover, according to the usage, a plurality of pieces of correction data may be provided for ambient temperatures, respectively, or correction data for only a typical temperature may be provided.

While the invention has been described in terms of a preferred embodiment, those skilled in the art will recognize that the invention can be practiced with modifications within the spirit and scope of the appended claims.

What is claimed is:

1. A resolver comprising:
   a resolver stator having an excitation winding of one phase adapted to be excited by a power supply and output windings of two phases for outputting a change in the density of magnetic flux as a voltage;
   a resolver rotor that is arranged at a central portion of said resolver stator and cooperates with said resolver stator for changing a gap permeance between said resolver rotor and said resolver stator in accordance with the rotation of said resolver rotor; and
   a detection error correction part that corrects an angle detection error of said resolver by using the value of a Lissajous radius of a circular Lissajous waveform obtained from respective amplitudes of an output signal Scos output from said first output winding and an output signal Ssin output from said second output winding of said output windings of said two phases, which are obtained by the following expressions:

$$S\cos = K \cdot E \cdot \sin \omega t \cdot \cos(\theta)$$

$$S\sin = K \cdot E \cdot \sin \omega t \cdot \sin(\theta)$$

where K represents a voltage transformation ratio of said resolver; E represents said excitation voltage generated on said excitation winding by means of said power supply; ω represents an angular velocity of an excitation signal generated by exciting said excitation winding by means of said power supply; t represents time, and θ represents an electrical angle of said resolver.

2. The resolver as set forth in claim 1, wherein an error amplitude A, an error amplitude B and an error phase C of said angle detection error are obtained from a maximum value MAX and a minimum value MIN of said Lissajous radius, and an angle θ m at a minimum point of said radius according to the following expressions:

$$\text{error amplitude } A = 2 \times \sin^{-1}\{(MAX-MIN)/(2 \times (MAX+MIN))\};$$

$$\text{error amplitude } B = 2 \times \sin^{-1}\{(MAX-MIN)/(2 \times (MAX+MIN))\}; \text{ and}$$

$$\text{error phase } C = \theta m.$$

3. The resolver as set forth in claim 1, wherein said resolver rotor is press-fitted to an end of a shaft of a motor built into an electric power steering apparatus.

4. The resolver as set forth in claim 3, wherein said detection error correction part is incorporated in an ECU for controlling the driving of said motor, calculates said angle detection error of said resolver based on said output signal Scos and said output signal Ssin input to said ECU, stores correction data for said angle detection error, and corrects said angle detection error of said resolver based on said correction data.

* * * * *